United States Patent [19]

Reick

[11] 3,879,302

[45] Apr. 22, 1975

[54] FLUOROCARBON-BASED SEALING COMPOUND

[75] Inventor: Franklin G. Reick, Westwood, N.J.

[73] Assignee: Michael Ebert, Mamaroneck, N.Y.; a part interest

[22] Filed: Oct. 24, 1973

[21] Appl. No.: 411,304

Related U.S. Application Data

[63] Continuation-in-part of Ser. No. 377,931, July 10, 1973.

[52] U.S. Cl............ 252/25; 117/138.8 UF; 252/11; 252/27; 252/49.5; 252/49.6; 252/58; 252/308; 252/363.5; 260/29.6 F
[51] Int. Cl............................................. C10m 1/10
[58] Field of Search........ 252/11, 25, 27, 49.5, 49.6, 252/58, 308, 363.5; 260/29.6 F, 448.2 H; 117/138.8 UF

[56] References Cited
UNITED STATES PATENTS

| | | | |
|---|---|---|---|
| 2,306,222 | 12/1942 | Patnode | 252/49.6 X |
| 2,786,042 | 3/1957 | Iler | 252/308 X |
| 3,011,975 | 12/1961 | Nitzsche et al. | 252/25 |
| 3,069,387 | 12/1962 | Allen et al. | 252/58 X |
| 3,105,824 | 10/1963 | Green et al. | 252/58 X |
| 3,194,762 | 7/1965 | Browning et al. | 252/58 X |
| 3,202,626 | 8/1965 | Fitzsimmons et al. | 252/58 X |
| 3,437,630 | 4/1969 | Van Winkle et al. | 252/58 X |
| 3,464,854 | 9/1969 | Bolger | 252/25 X |
| 3,580,880 | 5/1971 | Clarke et al. | 252/34.2 X |
| 3,793,197 | 2/1974 | Chapman | 252/58 X |

FOREIGN PATENTS OR APPLICATIONS

| | | | |
|---|---|---|---|
| 1,414,727 | 6/1962 | France | 117/138.8 UA |

*Primary Examiner*—Delbert E. Gantz
*Assistant Examiner*—Andrew H. Metz

[57] ABSTRACT

A sealing compound for pipe joints and the like, the compound being normally flowable but being rendered putty-like when subjected to shear or sliding forces. The compound is formulated from inert filler particles treated to acquire water-repellency, the treated filler being intermingled with an aqueous dispersion of microfine fluorocarbon powders stabilized by a charge-neutralizing agent which prevents clotting of the powders. Because of its initial flowability, the compound may easily be applied to the threading of a pipe or injected in a packing cavity to create a latent sealant therein. When the compound, in situ, is subjected to shear forces, the filler particles scrub the charge-neutralizing agent from the dispersed fluorocarbon powders whereby the powders then clot and bind together the filler particles to form a putty-like mass having exceptional packing and lubricating characteristics.

12 Claims, No Drawings

FLUOROCARBON-BASED SEALING COMPOUND

RELATED APPLICATION

This application is a continuation-in-part of my copending application Ser. No. 377,931 filed 7/10/73.

BACKGROUND OF THE INVENTION

This invention relates generally to sealing compounds for pipe joints and the like, and more particularly to an initially flowable fluorocarbon-based sealing compound that may be applied to the threading of a pipe or injected into a packing cavity, the compound when subjected to shear forces being rendered putty-like and acquiring high-pressure packing characteristics.

A packing material is one adapted to prevent or minimize leakage of a fluid through mechanical clearances. Where the clearance is that existing between the threaded end of a pipe received within an internally-threaded pipe joint or fitting, it is the common practice to apply a sealing compound of "dope" to the threads of the pipe before it is screwed into the joint or fitting.

One common type of sealing compound for this purpose is formed by a mixture of linseed or mineral oil, plasticzers and fine clay particles. These widely used compounds have a number of disadvantages, for when the oil dries out, the sealant cakes and becomes less effective. Also should the pipe coupling rust, it may be difficult or impossible to disassemble the joint should such be necessary. Another available type of sealing compound makes use of fine asbestos particles as a filler and this is objectionalbe because of the hazardous aspect of asbestos. Some sealing compounds incorporate granular particles of "Teflon" to improve the lubricity of the compound, but because of the oil carrier, such compounds are subject to oxidation, carbonization, volatilization and other drawbacks.

In recent years, pipe thread sealant tapes have become commercially available, such tapes being made from an extruded, unsintered Telfon TFE-fluorocarbon resin. This tape, which is non-flammable, non-toxic, and self-lubricating, is intended as a replacement for dopes to seal threaded connections on pipes made of plastic, iron and steel, copper, brass, aluminum and other materials. Because Teflon has a unique combination of electrical, chemical, temperature and low-friction properties (see U.S. Pat. No. 2,230,654), it may be used as a pipe sealant in environments which preclude conventional dopes, such as in hard-to-deal gas or liquid lines employed in the chemical and petrochemical industries, in lines carrrying liquid oxygen, nitric and other acids or in lines conducting caustics and other corrosives.

Unlike liquid or paste dopes that burn, spill or cake, a tape sealant is easy to use, for one merely lays the end of the tape on the pipe, starting near the end, the tape then being wrapped around in the direction of the threads. With a thread sealant tape formed of Teflon, threaded pipe joints will not seize and they can be disassembled easily. This is important in threaded joints requiring subsequent disassembly, such as those included in test gauges and in heating, air conditioning and fuel systems.

While Teflon tape has many advantages over standard sealing compounds or dopes, it has several drawbacks. Some of which are relatively serious. Unless the tape is wrapped in the proper direction about the pipe threads, it will unravel when the joint is run up. Also if the pipe end is improperly covered, tramp fragments of tape will get into the system and may plug orifices and valves. Because the tape is fabricated of pure Teflon, it has a strong tendency to cold flow, producing clearances, causing leakage. Moreover, when a taped joint is disassembled, the tape unravels and must be picked off the threads for remake.

SUMMARY OF THE INVENTION

In view of the foregoing it is the main object of this invention to provide a Teflon-based sealing compound which is normally flowable and readily applied to the threading of a pipe, the compound when subjected in situ to shear or sliding forces being rendered putty-like and acquiring high-pressure packing characteristics.

A significant advantage of the invention resides in the fact that the fluorocarbon-based sealing compound includes a significant amount of inert filler which modifies certain mechanical properties of the compound so that the compound has virtually no tendency to cold flow, and the effectiveness of the sealant is maintained under the most rigorous operating conditions.

Another object of the invention is to provide a sealing compound having lubricating properties both in the flowable or latent state and in the putty-like state whereby threaded pipes coated with the compound may readily be screwed into a joint or fitting or unscrewed therefrom, the compound forming a protective layer in the clearances between the pipe and the fitting so that even should rusting occur, a disconnection between the pipe and fitting is facilitated by the compound.

A salient feature of the invention is that unlike a Teflon tape it may be applied to pipe threading in any direction, and no difficulty is experienced in making and breaking joints, for after a joint is broken, all that need be done is to add more compound before the joint is reassembled.

Yet another object of the invention is to provide a sealing compound whose filler and fluorocarbon ingredients are safe, stable and non-reactive and usable on any threaded piping or in packing cavities in highyl-corrosive environments, including high-pressure oxygen lines.

Briefly stated, these objects are accomplished in a sealing compound formulated from inert filler particles preferably a mixture of both plate-like and needle-like particles, the filler particles being rendered water repellent and being intermingled with a dispersion of microfine fluorocarbon powders that are stabilized by a charge-neutralizing agent, such as a silane, which prevents clotting of the powders and imparts freeze-thaw stability thereto.

The compound is applied to the threading or to a packing cavity in its flowable or latent state. When the compound, in situ, is subjected to shear forces causing the filler particles to slide and to scrub the neutralizing agent from the fluorocarbon powders, the powders proceed to agglomerate and to bind together the filler particles to form a putty-like mass having packing as well as lubricating characteristics. Because the filler is composed of both needle-like and plate-like particles, the particles tend to interlock to create a stable mass.

DESCRIPTION OF THE INVENTION

The fluorocarbon-based sealing compound makes use of an aqueous dispersion of Teflon powders in microfine or submicronic sizes, such as Du Pont's TFE-42 or T-30 dispersions in which the particles are less than one micron in size. Teflon 30 (T-30) which is preferred is a milky white liquid consisting of minute prticles of tetrafluoroethylene resin suspended in water. Fundamentally the polymer in the dispersion is exactly the same as the polymer supplied in powder form for molding or extrusion (except for particle size) and has the inherent properties of Teflon tetrafluoroethylene resin. Teflon 30 dispersion contains 59 to 61 percent (by weight) tetrafluoroethylene resin with 5.5 to 6.5 percent of this weight as Triton x 100 (Rohm and Haas, Inc.), a nonionic wetting agent.

As is well-known, commercially available Teflon dispersions, such as T-30 are unstable, and should the dispersion be stored for an indefinite period it must be redispersed periodically by inverting or rolling the container, being careful to avoid violent stirring, for this will cause irreversible coagulation. Also to prevent irreversible coagulation, the dispersion must be protected against freezing.

The molecular structure of TFE fluorocarbon consists of chains of carbon atoms with all of the available bonds saturated by fluorine atoms. The carbon-to-carbon bonds are well protected by the saturation of fluorine atoms and the carbon-to-fluorine bonds are extremely strong, and hence are inert.

Molecules of Teflon are electrically neutral and have no strong polar forces binding them together. However, as pointed out in the Du Pont Technical Information Bulletin of April, 1965, "the extreme regularity of the molecules permit very close packing of the carbon chains which allows the relatively weak but very numerous van der Waals forces to add up to a substantial intermolecular attraction." It is these intermolecular attractions which give rise to the instability of ordinary Teflon dispersions, for T-30 and similar aqueous Teflon dispersions are hydrophobic colloids with charged particles which have a natural tendency to agglomerate and settle.

In order to render the Teflon dispersion freeze-thaw stable, I have discovered that by adding a silane or silizane thereto, such as amino silane (Union Carbide-A1100) or methyl trichloro silane (Dow Corning Z1211)- the resultant dispersions are remarkably freeze-thaw stable. As this phenomenon is presently understood, it is believed that a cloud of silane atoms attaches itself to each of the Teflon particles and serves effectively to neutralize the surfaces charged, thereby preventing clumping or agglomeration of the particles.

When, for example, 300 cc of T-30 dispersion is mixed with 30 cc amino silane (Gamma-Aminopropyltriethoxy Silane or Union Carbide A-1100), it can be repeatedly frozen solid and thawed without any measurable loss of properties. It can be highly dispersed in water or other fluids, since the silane inhibits the coagulation of particles. However, the viscosity of the stabilized dispersion after freezing and thawing is greater than the viscosity before freezing, the greater the percentage of silane within certain limits (i.e., a maximum of about 10 percent) in the dispersion the larger the change in viscosity.

This rise in viscosity as a result of freeze thawing is also encountered in the sealing compound in accordance with the invention wherein a mineral filler is intermingled with the stabilized Teflon dispersion. This change in viscosity may be exploited to afford a desired degree of flowability, ranging from a somewhat watery sealing compound to one approaching the consistency of ketchup.

If, for example, one wishes to produce a sealing compound in the form that lends itself to injection by means of a caulking gun or similar means into a packing cavity, then the sealing compound, after it is formulated, may be frozen and thawed to alter its flowability so that it becomes relatively viscous.

The mineral filler which is added to the stabilized T-30 aqueous dispersion is preferably a mixture of inert particles having a sheet or plate-like configuration and inert particles having a needle-like formation. The former is provided by water-ground mica, and the latter Attagel, clay, Wallastonite, milled glass fibers, graphite, coke flour, talc and other materials suitable filler characteristics.

One preferred filler mixture is 50 grams of water-ground mica, 15 grams of Attagel (colloidal grades of attapulgite) and 5 grams of Wallastonite. Another preferred mixture is constituted by 100 grams of water-ground mica, 40 grams of Attagel, 10 grams of Wallestonite (F-1) and 20 grams of Wallestonite (P-40). In order to achieve fine control over thixotropy, added to the mixture is a very small quantity (1 or 2 percent based on solid) of "Silanox" which is GL Cabot's silane-coated aerogel.

In order to render the filler resistant to settling in the stabilized Teflon aqueous dispersion, the particles thereof are made water repellent, as by means of the silicon treatment described in U.S. Pat. No. 2,306,222. In this treatment, solid bodies which are normally water non-repellent are subjected to an organo-silicon halide (e.g. methyl silicon chlorides) in vapor form to render the bodies water-repellent. After such treatment, the filler particles are preferably neutralized with several cc of ammonia. Another useful composition for rendering the particles water-repellent is methyltrichloro silane (Dow Corning Z1211).

Thus the procedure for formulating a sealing compound in accordance with the invention involves the steps of adding a neutralizing agent to an aqueous dispersion of microfine Teflon powders to render the dispersion freeze-thaw stable, and preparing a water-repellent mixture of suitable filler particles which is then added to the dispersion and intermingled therewith. It is important that this intermingling be carried out carefully with only gentle stirring or agitation, for otherwise, the compound will lose its flowability in that, as will be later explained, it is sensitive to shear forces. After the flowable compound is prepared it may be bottled or otherwise contained and then frozen and thawed to enhance its viscosity so that is is less watery and mildly thixotropic.

This sealing compound, when applied in its latent or flowable state to a pipe threading or injected into an O-ring groove or any gasket or packing cavity, will be caused to assume a putty-like consistency when subjected to shear or sliding forces. These shear forces are encountered in the course of screwing in a pipe. The reason this happens is that the forces act upon the filler particles which in movement act to scrub the neutralizing agent from the surfaces of the Teflon powders in the dispersion.

As a consequence, the Teflon powders in the dispersion regain their intermolecular attraction and the powders proceed to clump or clot and in this process to bind together the filler particles into a putty-like mass. The needle-like particles in the filler mixture tend to form an interlocking network with the plate-like filler particles. This mass, which incorporates Teflon powders, has exceptional packing and lubricating characteristics, for it not only possesses the qualities of a thread sealing tape of pure, unsintered Teflon, but because of the filler constituent is also highly resistant to cold-flowing. Hence when in the putty-like or packing state, the fluorocarbon-based sealing compound will prevent leakage in joints or in other environments requiring packing.

Because the lubricating characteristics of the compound exist both in the latent and packing states thereof, pipes may be readily assembled with fittings and joints and thereafter disassembled, without seizing or other deleterious effects sometimes encounted when trying to screw or unscrew a pipe.

While there has been described a preferred embodiment of the invention, it will be appreciated that many changes and modifications may be made therein without, however, departing from the essential spirit of the invention.

I claim:

1. A sealing compound for threaded pipe joints and the like, the compound being initially flowable but being converted into a putty-like mass having packing and lubricating properties when subjected to shear forces, said compound comprising inert mineral filler particles in an amount sufficient to provide virtually no cold flow of said compound and a freeze-thaw stabilized aqueous dispersion of a major amount of tetrafluoroethylene powders enveloped by a stabilizing agent constituted by a silicon compound selected from the group consisting of silanes and silizanes in an amount not in excess of about 10 percent by volume relative to the dispersion to impart freeze-thaw characteristics thereto that prevent clumping of the powders, said filler particles being intermingled with said dispersion whereby when the compound is subjected to shear forces that cause the filler particles to scrub off the agent from the powders, the powders then clump and bind the filler particles to form said putty-like mass.

2. A compound as set forth in claim 1, wherein the size of said powders is no greater than one micron.

3. A sealing compound as set forth in claim 1, wherein said agent is a silane.

4. A compound as set forth in claim 1, wherein said filler includes plate-like particles.

5. A compound as set forth in claim 4, wherein said plate-like particles are mica particles.

6. A compound as set forth in claim 4, wherein said filler includes needle-like particles.

7. A compound as set forth in claim 6, wherein said needle-like particles are formed by attapulgite.

8. A compound as set forth in claim 1, wherein said filler particles are water-repellent.

9. A sealing compound for threaded pipe joints and the like, said compound being initially flowable but being converted into a putty-like mass having packing and lubricating properties when subjected to shear forces, said compound comprising in an amount sufficient to provide virtually no cold flow of said compound an inert water-repellent mineral filler formed by a mixture of plate-like and needle1like particles, said filler particles being intermingled with an aqueous dispersion of tetrafluoroethylene powders coated with a stabilizing agent in the form of a silane in a relative amount that prevents clumping of the powders whereby when the compound is subjected to shear forces that cause the filler particles to scrub off the agent, the powders then clump and bind the filler particles to form said putty-like mass.

10. In a method of a forming a sealing compound comprising a water-repellent mineral filler and an aqueous-tetrafluoroethylene dispersion, said filler rendered water-repellent by treatment with a silicon agent, the improvement comprising:

A. adding a stabilizing agent selected from the group consisting of silanes and silizanes to an aqueous dispersion of a major amount of a tetrafluoroethylene powder in an amount sufficient to render said dispersion freeze - thaw stable and B. gently intermingling the treated filler particles with the stable dispersion to form said compound in flowable form, whereby said compound, when subjected to shear forces, converts into a putty-like mass having packing and lubricating characteristics.

11. The method as set forth in claim 10 further including the improvement of freezing and thawing the flowable compound to enhance its viscosity.

12. The method as set forth in claim 10 further including the improvement of adding hydrophilic silica areogel to the dispersion to reduce its thixotopic properties.

* * * * *